United States Patent [19]
Nishimura et al.

[11] Patent Number: 4,879,192
[45] Date of Patent: Nov. 7, 1989

[54] SECONDARY CELL

[75] Inventors: Shigeoki Nishimura, Katsuta; Kazunori Fujita, Toukai; Hiroyuki Sugimoto, Hitachi; Atsuko Tohyama, Hitachi; Noboru Ebato, Hitachi; Shinpei Matsuda, Tohkai, all of Japan

[73] Assignees: Hitachi Ltd.; Showa Denka K.K., both of Tokyo, Japan

[21] Appl. No.: 652,476

[22] Filed: Sep. 20, 1984

[30] Foreign Application Priority Data

Sep. 21, 1983 [JP] Japan .................. 58-173056

[51] Int. Cl.⁴ .............................. H01M 6/16
[52] U.S. Cl. ..................... 429/198; 429/213
[58] Field of Search ............ 429/194, 198, 243

[56] References Cited
U.S. PATENT DOCUMENTS

| 4,321,114 | 3/1982 | MacDiarmid | 429/199 X |
| 4,401,545 | 8/1983 | Naarman | 429/213 X |
| 4,471,038 | 9/1984 | Vyas | 429/213 X |
| 4,472,487 | 9/1984 | Maxfield | 429/194 |
| 4,518,665 | 5/1985 | Fujita et al. | 429/153 |
| 4,535,039 | 8/1985 | Naarmann et al. | 429/213 |
| 4,547,439 | 10/1985 | Genies | 429/105 |

FOREIGN PATENT DOCUMENTS

| 49140 | 4/1982 | European Pat. Off. . |
| 55057 | 6/1982 | European Pat. Off. . |
| 76119 | 4/1983 | European Pat. Off. . |
| 105768 | 4/1984 | European Pat. Off. . |
| 108594 | 5/1984 | European Pat. Off. . |
| 1494082 | 1/1969 | Fed. Rep. of Germany . |
| 906230 | 7/1962 | United Kingdom . |

OTHER PUBLICATIONS

Diaz et al., "Polypyrrole: A New Organic Electrode Material", IBM Journal of research and Development, V. 25, No. 1 (1/81), pp. 42–50.

Primary Examiner—Brian N. Hearn
Attorney, Agent, or Firm—Antonelli, Terry & Wands

[57] ABSTRACT

A secondary cell comprises opposed positive and negative electrodes of polymers, each having conjugated double bonds, such as polyacetylene, poly-phenylene, polythienylene and polypyrrole, and an electrolyte solution comprising an electrolyte dissolved in a nitrile compound and being interposed between the two electrodes.

17 Claims, 4 Drawing Sheets

SECONDARY CELL

BACKGROUND OF THE INVENTION

This invention relates to a secondary cell and more particularly, to a chargeable polymer secondary cell.

Polymers having conjugated double bonds, such as polyacetylene, have been known to form p-type or n-type conductive polyacetylene by electrochemically doping with anions such as $ClO_4^-$, $PF_6^-$, or $BF_4^-$, or with cations such as $Li^+$ or $(C_4H_9)_4N^+$ [J.C.S. Chem. Comm. (1979), pp. 594–595; C & EN, 26, 39 (1981)], and there have been disclosed chargeable cells utilizing the electrochemical doping. For example, a cell comprising positive and negative electrodes made of polyacetylene membrane and an organic electrolyte solution prepared by dissolving $(C_2H_9)_4NClO_4$ in propylene carbonate can afford an open-circuit voltage of 2.5 V and a short-circuit current of 11.1 mA [J.C.S. Chem. Comm. (1981), pp. 317–319]. Recently, attention has been drawn to secondary cells having polyacetylene electrodes for their high energy density (Wh/kg) and high output density (W/kg). However, cells of this kind are quite defective in life, that is, they have a very short life in repeated charging and discharging and can hardly find practical use as secondary cells.

SUMMARY OF THE INVENTION

An object of this invention is to provide a polymer secondary cell having superior life characteristics.

The present polymer secondary cell comprising electrodes, wherein at least either positive or negative electrode is composed of a polymer having conjugated double bonds, and an electrolyte interposed between the positive and negative electrodes is characterized in that a means is provided to control the loss in the conjugated double bonds in said polymer.

The present inventors have made various studies and finally attained the present invention based on new findings as follows. It has been clarified that the main cause for the cell life to decrease by repeated charging and discharging is that in the course of a cell reaction, particularly during the charging process, the electrolyte is decomposed by a side reaction occurring therein, or the organic solvent in which the electrolyte is dissolved is decomposed, to give active decomposition products, by which the conjugated double bonds in the polymer electrode are destroyed gradually. Accordingly, it has been confirmed that the cell life can be improved if only such decomposition products can be controlled from occurring or they can be trapped. Especially in respect of practical application and economic advantage, it has been found that an effective means of attaining a cell life enough for 150 consecutive times of charging and discharging should be to control the loss of the conjugated double bonds to at most 0.35 mol % per single charging operation. Through further investigation by the present inventors, it has also been found that the coulomb efficiency will drop suddenly from 80% to about 20% when the content of the conjugated double bonds in the polymer electrode has fallen to about 50 mol %. The cell with a coulomb efficiency of 20% can no longer stand practical application. Consequently, it has been concluded that a polymer secondary cell capable of 150 consecutive times of charging and discharging can be obtained by controlling the loss of the conjugated double bonds to at most 0.35 mol % in one charging operation.

The polymers having conjugated double bonds which can be used in this invention include various polymers such as polyacetylene, poly-phenylene, poly-thienylene and polypyrrole. The conductive polymers which can be used currently as secondary cell electrode material include poly-phenylene and polyacetylene. At present polyacetylene as a copolymer of acetylene may be thought to be the best polymer. There have been disclosed various polymerization methods for the preparation of polyacetylene used for such polymer electrodes [see, e.g., "Gosei Kinzoku" pp. 15, Kagaku Dojin (1980)], whereas polyacetylene prepared by any of known polymerization methods can be used in this invention. The electrolytes which can be used for doping the polyacetylene, i.e. dopant ions, include (i) anions of halides of Group Va elements, such as $PF_6^-$, $SbF_6^-$ and $AsF_6^-$, (ii) anions of halides of Group IIIa elements, such as $BF_4^-$, (iii) halide anions, such as $I^-$ ($I_3^-$), $Br^-$, $Cl^-$ and $F^-$, (iv) anions of perchloric acid, such as $ClO_4^-$, (v) alkali metal ions, such as $Li^+$, $Na^+$, $K^+$ and $Cs^+$, (vi) quaternary ammonium ions, such as $R_4N^+$ (wherein R is a hydrocarbon group having 1 to 20 carbon atoms) and (vii) phosphonium ions, such as $R_4P^+$ (where R is a hydrocarbon group having 1 to 20 carbon atoms). The compounds which can yield the above-mentioned anionic and cationic dopants include, for example, $LiPF_6$, $LiBF_4$, $LiClO_4$, $NaI$, $NaClO_4$, $KClO_4$, $(C_2H_5)_4NBF_4$, $(C_2H_5)_4NClO_4$, $NBF_4$ and $(C_4H_9)_4NClO_4$, though they shall not be limited to these examples. These dopants may be used alone or as a mixture thereof. The electrolyte solution used in this invention is prepared by dissolving the dopant in water or a non-aqueous solvent, among which the latter is preferably used, because a high cell voltage can be available thereby.

The electrolyte of this invention should be in a concentration ranging from 0.001 to 10 mol/l, which varies with the electrolyte (dopant) and solvent used.

DETAILED DESCRIPTION OF THE PREFERRED EMBODIMENTS

Figure 1A:
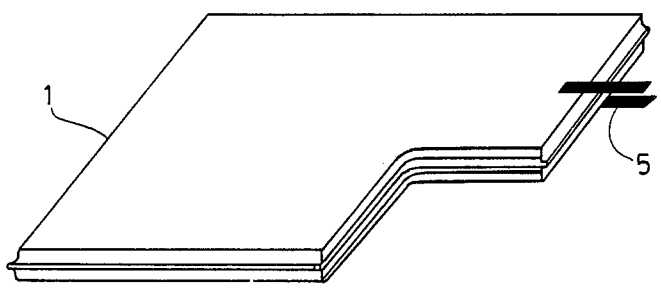
FIG. 1a is a perspective view of a partial cross section showing the structure of the polyacetylene secondary cell as an embodiment of this invention.
Figure 1B:
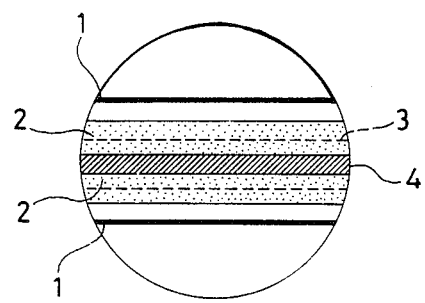
FIG. 1b is a partially enlarged view of the same cross section.

FIG. 1 shows an example of the structure of a single cell comprising polyacetylene electrodes and the above-mentioned dopant and solvent. Since polyacetylene and the doped polyacetylene are unstable to water and oxygen, the external wall as the cell casing is protected with a resin film 1 laminated with an aluminum membrane (1 to 100 μm in thickness). Moreover, an expanded metal sheet or metal gauze 3 made of a corrosion-resistant material such as SUS is embedded in each electrode, so that the polyacetylene electrode 2 can be provided with an increased current collecting effect and the electrode terminals 5 be taken out readily. Between the electrodes is placed a separator 4 made of a polypropylene or glass cloth, so that the electrodes be prevented from short-circuiting and the electrolyte solution be retained well. FIG. 1 shows a structural diagram of a single cell, but it is also possible to laminate them by placing a suitable conductive separator between the single cells to prevent the electrolyte solution from moving from one single cell to another. The theoretical energy density of the present cell whose electrodes are made of polyacetylene, where $LiBF_4$ is used as the dopant and the doping rate, (dopant (mol)/polyacetylene (mol))×100, is set to 30 mol %, is 355 Wh/kg, which is far greater than 230 Wh/kg for the conventional nickel-cadmium cell or 170 Wh/kg for the lead cell. The present cell, comprising inherently light electrodes, can achieve weight saving by employing a cell casing reinforced with a metal laminate which is impermeable to oxygen and water. Its effective energy density is also greater than 25 Wh/kg for the nickel-cadmium cell or 30 Wh/kg for the lead cell.

Figure 2:
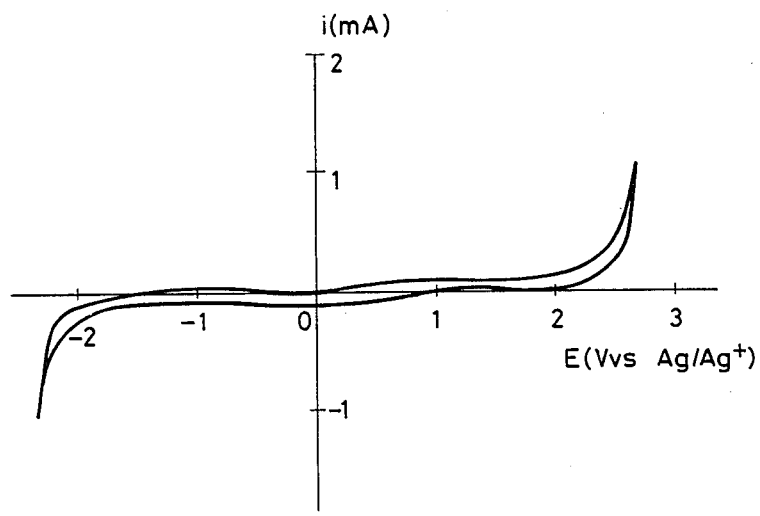
FIG. 2 is a cyclic voltamgram of the electrolyte solution on the Pt electrode.
Figure 3:
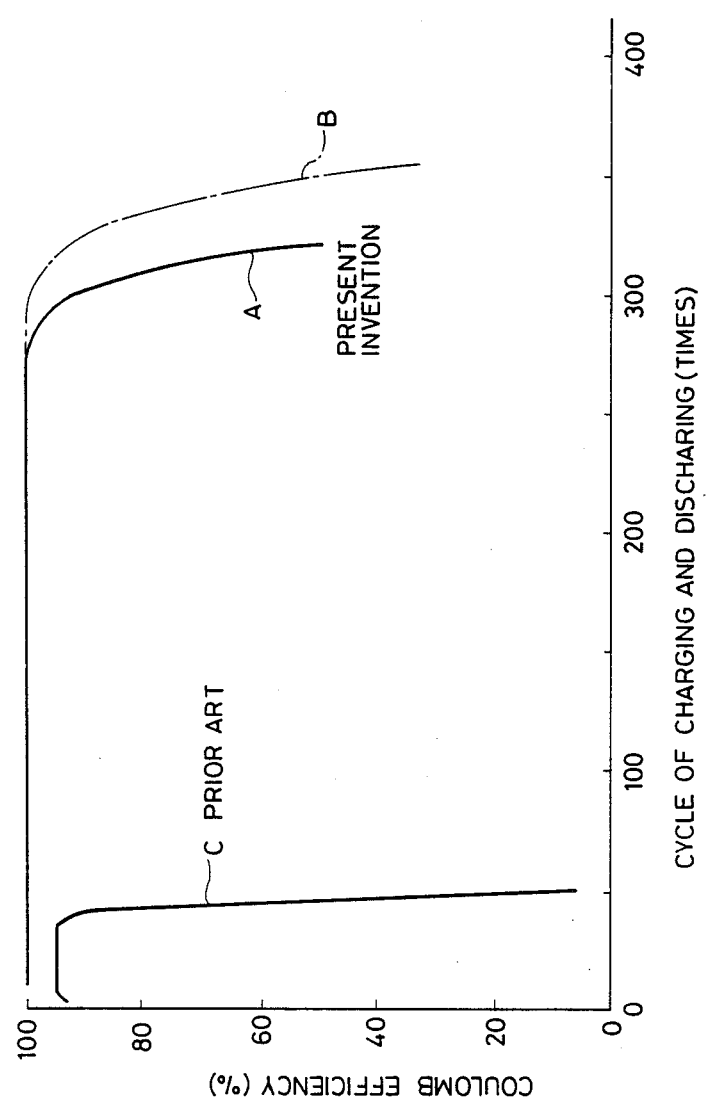
FIG. 3 is a graph showing the charging and discharging cycle characteristics of the secondary cell as an embodiment of this invention and the conventional cell.

Now, a test cell was prepared from polyacetylene having a thickness of 200 μm, using $(C_2H_5)_4NBF_4$ as the dopant, $CH_3CN$ as the solvent, and the electrolyte solution in a concentration of 1 mol/l. The cell was tested for charging and discharging cycles at a current density of 5 mA/cm² and a doping rate of 4 mol % to find that its life was about 50 cycles as shown in FIG. 3. The cell having such a short charging and discharging cycle life cannot afford a secondary cell displaying its functions to the full. The short cycle life is believed to be due to the denaturation of the polyacetylene electrodes. FIG. 2 shows a cyclic voltamgram of the electrolyte solution [dopant: $(C_2H_5)_4NBF_4$, solvent: $CH_3CN$] where the active electrode is composed of a platinum plate. The reference electrode comprising $Ag/Ag^+$ was used. A reduction occurred at potentials of −2.0 V or below, so that a reducing current flowed, while an oxidation occurred at potentials of +2.2 V or above, so that an oxidizing current flowed. FIG. 3 shows changes in the electrode potential at the 35th charging and discharging cycle. The potential on the negative electrode went down to −2.5 V, based on the $Ag/Ag^+$ reference electrode. From the above finding, it is believed that some decomposition reaction occurred on the surface of the negative electrode to cause the electrode denaturation to proceed. On completion of the 54th cycle shown in FIG. 3, the electrodes were submitted to elementary analysis for C, H and N, and the results are shown in Table 1.

TABLE 1

Elementary analysis of electrodes on completion of their life

| Electrode | Composition (wt %) | | | | Ratio (by mole) | |
|---|---|---|---|---|---|---|
| | C | H | N | Residue | H/C | N/C |
| Positive electrode | 47.4 | 4.6 | 9.5 | 38.5 | 1.19 | 0.172 |
| Negative electrode | 82.7 | 10.0 | 0.1 | 7.2 | 1.45 | 0.001 |

The infrared absorption spectra and the elementary analysis of the electrodes indicated a hydrogen addition to the negative electrode and a nitrile addition to the positive electrode. By the addition of these functional groups, polyacetylene had its double bonds destroyed considerably, so that the amount of the double bonds capable of doping decreased. The double bond decrease on the negative electrode in this case was 45 mol %.

The addition reaction of the nitrile group and hydrogen to polyacetylene $(CH)_x$ may be represented by the following scheme, though its reaction mechanism has not been clarified as yet.

Positive electrode:

$$BF_4^- \rightarrow BF_4\cdot + e^- \qquad (1)$$

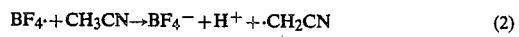
$$BF_4\cdot + CH_3CN \rightarrow BF_4^- + H^+ + \cdot CH_2CN \qquad (2)$$

$$\cdot CH_2CN \rightarrow {^+}CH_2CN + e^- \qquad (3)$$

$$(CH)_x + y\cdot CH_2CN \rightarrow (CH)_{x-y}\cdot(CHCH_2CN)_y \qquad (4)$$

Negative electrode:

$$CH_3CN + e^- \rightarrow H^+ + {^-}CH_2CN \qquad (5)$$

$$H^+ + e^- \rightarrow \cdot H \qquad (6)$$

$$(CH)_x + y\cdot H \rightarrow (CH)_{x-y}\cdot(CH_2)_y \qquad (7)$$

The destruction of the double bonds in polyacetylene is partly caused by radicals as shown in formulas (4) and (7). A further test for charging and discharging cycles was made under varied conditions (including the doping rate and the current density) using $LiBF_4$, $LiClO_4$ or $(C_2H_9)_4NBF_4$ as the dopant and sulfolane, propylene carbonate or tetrahydropyran as the solvent, and the electrodes on completion of their life were submitted to elementary analysis. As a result, it was found that the decrease in the double bonds was invariably about 50 mol % in most cases and that the coulomb efficiency at this time went down to about 20%.

In constant-current charge, the rate of decrease in the conjugated double bonds was variable at the respective cycles: It was small during the initial charging and discharging cycles and became greater in later cycles. The rate of decrease was small as long as the radical scavenger was retained in an enough amount.

The polymer secondary cell as intended in this invention can be realized by allowing the polymer electrode to carry on its surface or inside a substance capable of trapping radicals formed by the side reactions of the electrode.

In this invention, it is also effective to incorporate the polyacetylene electrode or the electrolyte solution with at least one member selected from adsorbents for the above-mentioned decomposition products, such as inorganic adsorbents, for example, active alumina, silica or aluminosilicate, and organic adsorbents, for example, styrene, crosslinked divinylbenzene gel, acrylate resin, active carbon or polyacetylene.

In this invention, moreover, stable solvents which sparingly cause electrode side-reactions, such as nitrile compounds, can also be effectively used as solvents for the electrolyte.

On repetition of the charging and discharging cycles, electro-chemical reactions occur to form radicals, whereby conjugated double bonds are destroyed and sites capable of doping are decreased as described above. Accordingly, it will be possible for the cell to widely extend its charging and discharging cycle life, if a substance which will readily react with the radicals, such as a radical scavenger, is supported on the surface or inside of the electrode or incorporated in the electrolyte before the radicals formed by the side reactions undergo an addition reaction with the conjugated double bonds in the polyacetylene electrode.

The radical scavengers include, for example, mercaptans, aromatic nitro compounds, hydroquinone, diphenylpyridylhydrazide, 1-3-5-triphenyl verdazine, quinones, t-butylcatechol, chloranil, pyrogallol, dimethylthiocarbamates, oxygen and sulfur. The trapping of hydrogen radicals by hydroquinone is believed to proceed according to the reaction formulas (8) and (9).

(8)

(9)

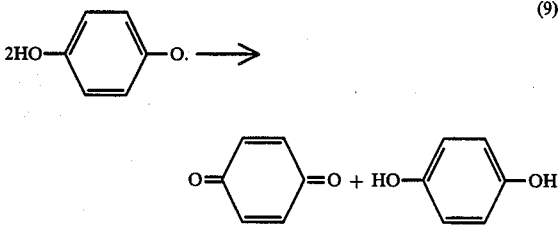

The cell life depends on the competitive reactions (7) and (8). When hydroquinone has completely been consumed by the reactions (8) and (9), the reaction (7) will proceed to denature the electrode.

The amount of the radical scavenger to be added to the electrolyte system varies with the kind of radical scavengers which are different in activity, so that its concentration must be selected properly, depending on its kind. For instance, the concentration of hydroquinone for exhibiting its effect of extending the cell life was found to be in the range from $1 \times 10^{-3}$ to 1 mol/l, though depending on the cycle life as well.

In this invention, moreover, the use of a stable solvent for the electrolyte as shown is effective in controlling the reactions (1) through (7) and extending the cell life. Table 2 shows the stable potential ranges observed with various solvents on platinum plates. $CH_3CN$ and sulfolane afford wide potential ranges, whereas nitrile compounds are particularly effective in view of the fact that they are superior in solubility and can afford a high conductivity.

TABLE 2

| | Stable potential ranges | | |
|---|---|---|---|
| Solvent | Electrolyte | Negative electrode (V)* | Positive electrode (V)* |
| propylene carbonate | 0.5M($C_4H_9$)$_4$NClO$_4$ | −2.7 | +1.7 |
| acetonitrile | 1.0M($C_2H_5$)$_4$NClO$_4$ | −2.0 | +2.2 |
| sulfolane | 0.8M($C_2H_5$)$_4$NClO$_4$ | −2.3 | +2.5 |
| DMF | 0.5M($C_4H_9$)$_4$NClO$_4$ | −1.0 | +0.9 |
| DMSO | 0.5M($C_4H_9$)$_4$NClO$_4$ | −2.1 | +0.8 |
| hydropyran | 0.5M($C_4H_9$)$_4$NClO$_4$ | −1.0 | +0.9 |
| benzonitrile | 0.5M($C_4H_9$)$_4$NClO$_4$ | −2.3 | +2.3 |

(*vs Ag/Ag$^+$)

Embodiments of this invention will now be described.

EXAMPLE 1

The electrolyte solution herein was prepared by using ($C_2H_5$)$_4$NBF$_4$ as a dopant in a concentration of 1 mol/l and $CH_3CN$ as a solvent and adding thereto $1.2 \times 10^{-2}$ mol/l of hydroquinone as a radical scavenger. The quantity of the electrolyte solution used was 0.5 ml. The polyacetylene used had a density of 0.3 g cm$^3$ and a thickness of 100 μm. The polyacetylene electrode was cut out to 10 mm in diameter, and a platinum gauze (100 μm in mesh size) was used as a current collector. The cell was charged and discharged in repeated cycles at a current density of 5 mA cm$^3$ and a doping rate of 4 mol %. The results are represented by curve A in FIG. 3. The initial coulomb efficiency was 99% or above, the cycle number was 320 at a point where the coulomb efficiency went down below 50%, and the loss of the double bonds per cycle was 0.08 mol %.

EXAMPLE 2

The same electrolyte solution as in Example 1 was used, and $5 \times 10^2$ mol/l of diphenylpyridylhydrazide was added as a radical scavenger. The cell was charged and discharged, using the same polyacetylene electrodes and cycle test conditions as in Example 1. It was found that the cycle number was 305 at a point where the coulomb efficiency went down below 50%, and the loss of the double bonds at this time was 0.13 mol %/cycle.

EXAMPLE 3

($C_4H_9$)$_4$NBF$_4$ was used as a dopant in a concentration of 1 mol/l, and propylene carbonate as a solvent. Hydroquinone was used as a radical scavenger, which was added in an amount of 6 wt % of polyacetylene and mixed in a mortar under an Ar atmosphere. The polyacetylene was press-molded for shaping into an electrode and cut out to 10 mm in diameter. The cell was charged and discharged in repeated cycles under the same cycle test conditions as in Example 1. The cycle number was 310 at a point where the coulomb efficiency went down below 50%. The loss of the double bonds was 0.16 mol %/cycle.

EXAMPLE 4

($C_4H_9$)$_4$NBF$_4$ was used as a dopant in a concentration of 2 mol/l, and

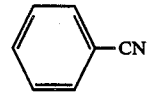

as a solvent. Triphenylmethyl was added as a radical scavenger in an amount of $1 \times 10^{-2}$ mol/l to the electrolyte solution. The polyacetylene used and the charging and discharging cycle test conditions were the same as in Example 1. The results are represented by curve B in FIG. 3. The initial coulomb efficiency was 99% or above, the cycle number was 350 at a point where the coulomb efficiency went down below 50%, and the loss of the double bonds in the cycle test was 0.12 mol %/cycle.

EXAMPLE 5

Figure 4:
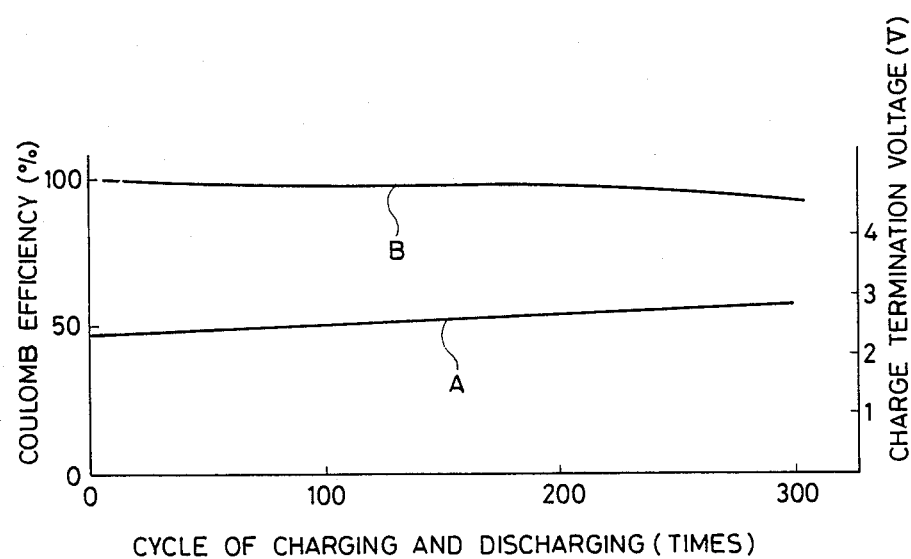
FIG. 4 is a graph showing the relation between the coulomb efficiency and the charge/discharge termination voltage in the secondary cell as an embodiment of this invention.

A cell was constructed by the use of ($C_2H_5$)$_4$NBF$_4$ as a dopant in a concentration of 1 mol/l, $CH_3CN$ as a solvent, and polyacetylene in the same specification as in Example 1. The charging and discharging cycle test was carried out at a charge/discharge current density of 5 mA/cm$^2$, doping rate of 1 mol % and a discharge termination voltage of 1 V. FIG. 4 shows the relation of the cycle number with the charge termination voltage (curve A) and the coulomb efficiency (curve B). The coulomb efficiency was 93% at the 300th cycle, and the charge termination voltage at this time was 2.92 V. The loss of the double bonds was 0.04 mol %/cycle, indicating that the polyacetylene underwent very little denaturation.

EXAMPLE 6

LiBF$_4$ was used as a dopant in a concentration of 1 mol/l, propylene carbonate was used as a solvent, and powdery active alumina was incorporated in the separator. The polyacetylene used had a density of 0.3 g/cm$^3$ and a thickness of 100 μm, which was cut out to 100 mm in diameter for use as the electrode. The active alumina was neutral and had a specific surface area of 450 m$^2$/g, which was used in an amount of 0.5 g. The cell thus prepared was submitted to a charging and discharging cycle test under the same conditions as in Example 1. The cycle number was 170 at a point where the coulomb efficiency went down below 50%, and the loss of the double bonds in polyacetylene was 0.28 mol % per cycle.

COMPARATIVE EXAMPLE 1

A cell comprising the same electrolyte solution as in Example 4, without the addition of a radical scavenger, was first submitted to a charging and discharging cycle test for 20 times under a current density of 5 mA/cm$^2$ and a doping rate of 4 mol %. The cycle test was further continued after the addition of 1×10$^{-2}$ mol/l of the same radical scavenger as in Example 4. It was found that the loss of the double bonds was 0.20 mol %/cycle at a point where the coulomb efficiency went down below 50%, and it is evident that the addition of the radical scavenger had a small but appreciable effect.

COMPARATIVE EXAMPLE 2

A cell comprising the same electrolyte solution as in Example 4, without the addition of a radical scavenger, was submitted to a charging and discharging cycle test under a current density of 5 mA/cm$^2$ and a doping rate of 4 mol %. The loss of the double bonds was 0.40 mol %/cycle.

COMPARATIVE EXAMPLE 3

A cell comprising the same electrolyte solution as in Example 3, without the addition of a radical scavenger, was submitted to a charging and discharging cycle test under a current density of 5 mA/cm$^2$ and a doping rate of 4 mol %. The loss of the double bonds was as high as 0.7 mol %/cycle.

We claim:
1. A polymer secondary cell comprising:
a positive electrode;
a negative electrode, wherein at least one of said positive electrode and said negative electrode is composed of a polymer having conjugated double bonds; and
an electrolyte interposed between the positive and negative electrodes, wherein, during charging and discharging of said secondary cell, electrochemical reactions occur to form, as reaction products, radicals which can destroy said conjugated double bonds;
said secondary cell further comprising at least one of (1) radical scavengers which react with said radicals to remove said radicals prior to said radicals destroying the conjugated double bonds, and (2) adsorbents, other than polyacetylene, which adsorb the reaction products so as to prevent destruction of the conjugated double bonds, said at least one of (1) radical scavengers and (2) adsorbents being incorporated in at least one of the electrolyte and positive and negative electrodes.

2. A polymer secondary cell as set forth in claim 1, wherein the secondary cell includes the adsorbents, other than polyacetylene, which adsorb the reaction products so as to prevent destruction of the conjugated double bonds.

3. A polymer secondary cell as set forth in claim 2, wherein said adsorbents are selected from the group consisting of active alumina, silica, aluminosilicate, styrene, cross-linked divinylbenzene, acrylate resin, and active carbon.

4. A polymer secondary cell as set forth in claim 1, wherein said at least one of (1) radical scavengers and (2) adsorbents are incorporated in at least one of said electrolyte and said at least one of the positive and negative electrodes composed of a polymer having conjugated double bonds.

5. A polymer secondary cell as set forth in claim 1, wherein said electrolyte is dissolved in a nitrile compound.

6. A polymer secondary cell as set forth in claim 1, wherein the secondary cell includes both said radical scavengers and said adsorbents.

7. A polymer secondary cell comprising:
a positive electrode;
a negative electrode, at least one of said positive electrode and said negative electrode being composed of a polymer having conjugated double bonds;
an electrolyte interposed between the positive and negative electrodes; and
at least one radical scavenger, selected from the group consisting of mercaptans, aromatic nitro compounds, hydroquinone, diphenylpyridylhydrazide, 1-3-5 triphenyl verdazine, quinones, t-butylcatechol, chloranil, pyrogallol, dimethylthiocarbamates, oxygen and sulfur, said at least one radical scavenger being incorporated in at least one of the electrolyte and positive and negative electrodes, thereby to react with radicals formed by side reactions occurring in said secondary cell.

8. A polymer secondary cell as set forth in claim 7, wherein said electrolyte is dissolved in a nitrile compound.

9. A polymer secondary cell comprising:
a positive electrode;
a negative electrode, at least one of said positive electrode and said negative electrode being composed of a polymer having conjugated double bonds;
an electrolyte interposed between the positive and negative electrodes; and
at least one substance, selected from the group consisting of mercaptans, aromatic nitro compounds, hydroquinone, diphenylpyridylhydrazide, 1-3-5 triphenyl verdazine, quinones, t-butylcatechol, chloranil, pyrogallol, dimethylthiocarbamates, oxygen, sulfur, active alumina, silica, aluminosilicate, styrene, crosslinked divinylbenzene gel, acrylate resin, and active carbon, being incorporated in at least one of the electrolyte and positive and negative electrodes, to thereby trap decomposition products formed in the cell reactions.

10. A polymer secondary cell as set forth in claim 9, wherein said electrolyte is dissolved in a nitrile compound.

11. A polymer secondary cell comprising:
a positive electrode;
a negative electrode, at least one of said positive electrode and said negative electrode being composed of a polymer having conjugated double bonds; and
an electrolyte interposed between the positive and negative electrodes, wherein, during charging and discharging of said secondary cell, electrochemical reactions occur to form, as reaction products, radicals which can destroy said conjugated double bonds;
said secondary cell further comprising radical scavengers which react with said radials to remove said radicals prior to said radicals destroying the conjugated double bonds, said radical scavengers being incorporated in at least one of the electrolyte and positive and negative electrodes.

12. A polymer secondary cell as set forth in claim 11, wherein the radical scavengers are selected from the group consisting of mercaptans, aromatic nitro compounds, hydroquinone, diphenylpyridylhydrazide, 1-3-5 triphenyl verdazine, quinones, t-butylcatechol, chloranil, pyrogallol, dimethylthiocarbamates, oxygen and sulfur.

13. A polymer secondary cell as set forth in claim 12, wherein the radical scavengers are selected from the group consisting of mercaptans, hydroquinone, diphenylpyridylhydrazine, 1-3-5 triphenyl verdazine, quionones, t-butylcatechol, chloranil, pyrogallol, dimethylthiocarbamates, oxygen and sulfur.

14. A polymer secondary cell comprising:
a positive electrode;
a negative electrode, at least one of said positive electrode and said negative electrode being composed of a polymer having conjugated double bonds;
an electrolyte interposed between the positive and negative electrodes; and
at least one adsorbent, selected from the group consisting of active alumina, silica, aluminosilicate, styrene, crosslinked divinylbenzene gel, acrylate resin, and active carbon, said at least one adsorbent being incorporated in at least one of the electrolyte and positive and negative electrodes, thereby to adsorb decomposition products formed in the cell reactions.

15. A polymer secondary cell as set forth in claim 14, wherein said electrolyte is dissolved in a nitrile compound.

16. A polymer secondary cell as set forth in claim 14, wherein said at least one adsorbent is selected from the group consisting of active alumina, silica and aluminosilicate.

17. A polymer secondary cell as set forth in claim 14, wherein said at least one adsorbent is selected from the group consisting of styrene, crosslinked divinylbenzene gel, acrylate resin and active carbon.

* * * * *